No. 779,886. PATENTED JAN. 10, 1905.
G. H. STEWART.
METHOD OF SOLDERING.
APPLICATION FILED AUG. 10, 1904.
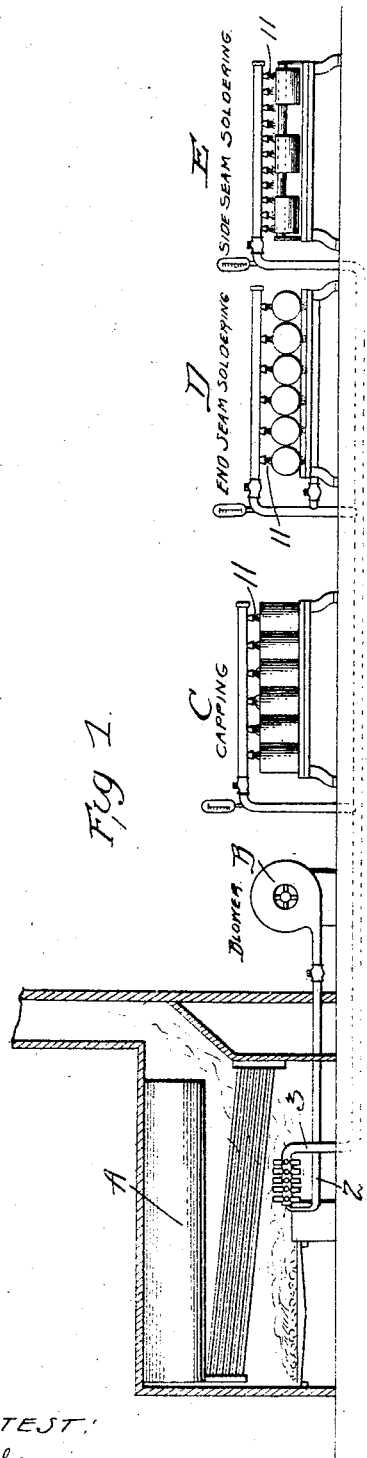
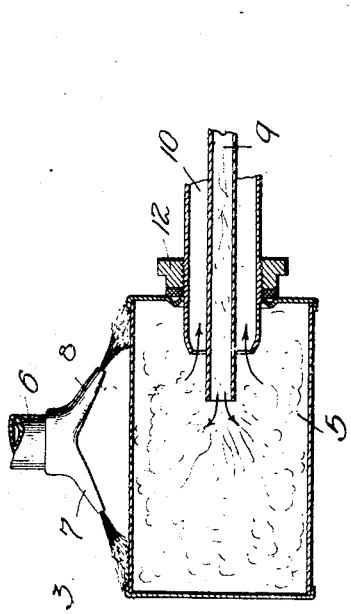
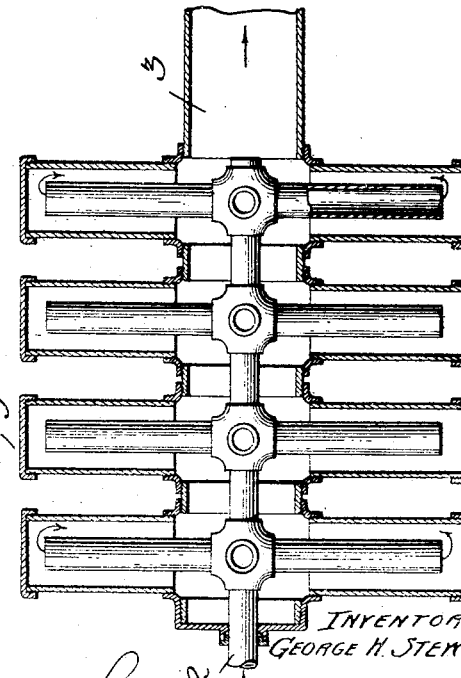
ATTEST:
C. S. Middleton
Edward Sarton
INVENTOR.
GEORGE H. STEWART.
By Spear, Middleton, Donaldson & Spear
Att'ys No. 779,886. Patented January 10, 1905.

UNITED STATES PATENT OFFICE.

GEORGE H. STEWART, OF LOS ANGELES, CALIFORNIA.

METHOD OF SOLDERING.

SPECIFICATION forming part of Letters Patent No. 779,886, dated January 10, 1905.

Application filed August 10, 1904. Serial No. 220,264.

*To all whom it may concern:*

Be it known that I, GEORGE H. STEWART, a citizen of the United States, residing at Los Angeles, California, have invented certain new and useful Improvements in Methods of Soldering, of which the following is a specification.

My invention herein described is an improved method of soldering, and though not limited in its applicability to particular articles is herein shown as applied to the soldering of ordinary packing-cans as presenting its largest field of usefulness. It is intended to take the place of the present usual methods of heating by flame of gas or gasolene-vapor or by any of the products of combustion. These methods are effectual, but are attended by some defects, such as irregularity of the flame, the presence of the products of combustion or other impurities in the heating medium, great variation of temperature, waste of fuel, expense of carbureting and special heating devices, frequent inconvenience to the workmen arising from the heat, and the scorching of the cans.

Instead of these my invention consists in the method of heating the can and melting the solder by the use of a body or blast of heated air, which may be applied as flame is generally applied or to the interior or exterior of the can to heat the same and fuse the solder, or the can may be introduced into a body of heated air.

In order more fully to explain this improved method, I have illustrated in the accompanying drawings an apparatus devised by me for practically carrying out my said invention.

In the drawings, Figure 1 shows in diagrammatic form the apparatus and mechanism for practicing my invention. Fig. 2 shows a central longitudinal section of the air-heater, and Fig. 3 illustrates different methods of applying the heated air to the can.

This apparatus manifestly may be greatly varied and is shown merely for illustration. An ordinary boiler-furnace is shown at A, indicating how the heat for soldering may be obtained by utilizing the furnace which supplies power to the shop and without the expense or inconvenience of a separate heating apparatus. In this furnace is located an air-heater having induction and eduction pipes 2 and 3, 2 leading from an air-forcing mechanism B, which drives the air to the heater, and 3 leading the heated air from the heater to the soldering mechanism.

Any suitable capping-machine is shown at C, and at D and E are indicated, respectively, end-soldering and side-soldering mechanism. These may be of any construction suited to the purpose, and, indeed, any of the can holding and moving mechanism now in use may be employed, as the hot air may be directed against the can and solder as flame is now directed; but in Fig. 3 I have shown two methods of directing the air.

The can 5 may be supported and driven by any suitable mechanism well known for the purpose. In suitable range therewith are inclined nozzles 7 and 8 on hot-air-supply pipe 6, these nozzles being located and directed so as to cause the blast to impinge at an angle upon the can-surface and drive toward the seam. In the same figure I have shown how the hot air may be introduced into the interior of the can and heat the same, so that the solder in wire or other suitable form may be fused as the can revolves or is moved. In this modification the air is introduced and finds exit through the filling-opening in the head. A large pipe 10 is provided with a padded collar 12, which fits air-tight against the margin of the orifice in the head. The inner end of the pipe 10 is open to the interior and the other end discharges to the atmosphere. A hot-air-supply pipe 9 is axially arranged in the pipe 10 with an annular space around it and between it and the pipe 10. Hot air forced through pipe 9 enters the can, heats it, and escapes through the pipe 10. Either of these methods may be used or both together. The hot air may be applied in soldering the side seams, as indicated at E in Fig. 1. The cans are then arranged longitudinally and may be held and moved in any suitable way. The hot-air blasts are indicated at 11, arranged in line with the side seam.

It will be understood that the force and volume of the air-discharge, and therefore the temperature, may be regulated by suitable cocks and gages, and, indeed, automatically, so that variations in the heat generated in the air-heater, due to exigencies in use or to changes in the furnace-fire, may be controlled and the heat at the soldering-point rendered perfectly uniform.

The method is applicable however the solder may be applied to form the joint or union or in whatever form or whatever the form of metal parts to be united.

I use the term "air" to indicate any similar medium.

I claim—

1. The process of soldering which consists in bringing the parts together, applying heated air to melt the solder and permitting the parts to cool, thus forming the joint or union, substantially as set forth.

2. The process of forming soldered joints which consists in bringing the parts together, applying a blast of heated air to melt the solder and permitting the parts to cool, thus closing the joint, substantially as described.

3. The process of soldering which consists in bringing together the parts to be united, applying heated air to melt the solder, filling the joint therewith and permitting the parts to cool, substantially as set forth.

4. The method of soldering hereinbefore described, consisting in bringing the parts to be united together, melting the solder by the application of a blast of heated air to the joint or contiguous metal and allowing the parts to cool.

In testimony whereof I affix my signature in presence of two witnesses.

GEORGE H. STEWART.

Witnesses:
 HENRY E. COOPER,
 EDWARD L. REED.